(12) United States Patent
Bostick et al.

(10) Patent No.: US 9,619,443 B2
(45) Date of Patent: Apr. 11, 2017

(54) ENHANCED MESSAGING TRANSACTION PERFORMANCE WITH AUTO-SELECTED DUAL-TAG FIELDS

(75) Inventors: James Edward Bostick, Cedar Park, TX (US); John Michael Ganci, Jr., Cary, NC (US); John Paul Kaemmerer, Pflugerville, TX (US); Craig Matthew Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/411,689

(22) Filed: Mar. 5, 2012

(65) Prior Publication Data
US 2013/0232108 A1    Sep. 5, 2013

(51) Int. Cl.
G06F 17/30    (2006.01)
G06F 17/22    (2006.01)

(52) U.S. Cl.
CPC ...... *G06F 17/2247* (2013.01); *G06F 17/2276* (2013.01)

(58) Field of Classification Search
CPC ......... G06F 17/30569; G06F 17/30914; G06F 17/272; H03M 7/30
USPC ........ 707/610, 756, 602; 715/242, 236, 237, 715/239; 709/231; 710/68
See application file for complete search history.

(56) References Cited

U.S. PATENT DOCUMENTS

| | | | |
|---|---|---|---|
| 6,883,137 B1 | 4/2005 | Girardot et al. | |
| 6,996,773 B2 | 2/2006 | Friedman et al. | |
| 7,500,017 B2 | 3/2009 | Cseri et al. | |
| 7,546,526 B2 | 6/2009 | Spada | |
| 7,716,576 B1 | 5/2010 | Le et al. | |
| 7,856,595 B2 | 12/2010 | Itani | |
| 8,090,731 B2 | 1/2012 | Sthanikam et al. | |
| 2003/0046317 A1* | 3/2003 | Cseri et al. | 707/513 |
| 2003/0051056 A1* | 3/2003 | Pascual et al. | 709/247 |

(Continued)

FOREIGN PATENT DOCUMENTS

| | | |
|---|---|---|
| EP | 1 122 655 | 8/2001 |
| KR | 10-2004-0070894 | 8/2004 |
| KR | 10-2008-0073115 | 8/2008 |

OTHER PUBLICATIONS

Uche Ogbuji; "Compress XML Files for Efficient Transmission: Who Need Binary XML When We Have Good Compression?"; IBM Corporation, developerWorks, 2004, pp. 1-4.

*Primary Examiner* — Dennis Truong
(74) *Attorney, Agent, or Firm* — Whitham, Curtis & Cook, PC; John R. Pivnichny

(57) ABSTRACT

A schema for a mark-up language provides a meaningful name and a short name, both of which are valid, for each of a plurality of data fields in messages coded in a mark-up language such as extensible mark-up language (XML). Code conversion of legacy data to use the short names reduces data volume for transmission, storage and processing while allowing the message to be automatically displayed for inspection, diagnostics and data synchronization during a transformation project such as an upgrade of a data processing system for verification of system operation. The ability to display meaningful names only for such purposes allows text editor arrangements to be used for data synchronization while use of short names improves virtually all aspects of system performance.

20 Claims, 2 Drawing Sheets

(56) References Cited

U.S. PATENT DOCUMENTS

2007/0299853 A1* 12/2007 Knotz et al. .................... 707/10
2012/0191760 A1* 7/2012 Kaufman et al. ............. 707/802

* cited by examiner

ENHANCED MESSAGING TRANSACTION PERFORMANCE WITH AUTO-SELECTED DUAL-TAG FIELDS

FIELD OF THE INVENTION

The present invention generally relates to reduction and restoration of data for efficient transmission and, more particularly, to reduction and restoration of data that has been coded in a form usable by data processors for different purposes.

BACKGROUND OF THE INVENTION

Large enterprise environments require large amounts of data processing power and data storage capacity to support creation and exchange of large amounts of data among personnel involved with the enterprise. Such data processing power and data storage capacity is often provided through a large data processor or network of processors or servers serving a large network of client computers or terminals which may also provide some local data storage and data processing capacity. In such environments, additional processors or servers are added and/or upgraded with substantial frequency as data processing and communication requirements increase over the duration of the enterprise. Since the duration of an enterprise may extend over many years, it is not uncommon for substantial portions of the data processing capacity to be replaced due to obsolescence, alteration of system architecture, changes in functions of the enterprise and the like. When such changes, upgrades and additions to the data processing system are made (sometime collectively referred to as transformation projects), it is necessary for new equipment to be operated with equipment previously existing in the system (often referred to as legacy systems) and have the capability of seamlessly exchanging data between portions of the system.

When a large transformation project is performed, a substantial period of time is required to ascertain that newer portions of the system are working together properly with or prior to decommissioning of legacy portions of the system and, importantly, that data is properly usable by all portions of the system. Sometimes conversion of data for use by different portions of the system may also be required. During such a period the volume of data transferred between different portions of the system may be greatly increased as operation of the system is verified and any problems that are encountered are located and corrected. However, such increased volume of communicated data must nevertheless be carried over network infrastructure that is scaled in capacity for normal enterprise operations.

Much of the data messages communicated within an enterprise is coded into a so-called mark-up language in which the data is placed in a field that is defined and the data identified by a so-called tag that accompanies the data in the message. A number of such languages are known such as hypertext mark-up language (HTML), structured query mark-up language (SQML) and extensible mark-up language (XML). These languages provide the advantage that data contained in messages can be retrieved and utilized (e.g. formatted, presented, suppressed, decrypted/decoded in different ways and the like) in any desired manner and to accommodate any of many diverse forms of data in accordance with the tags defining the fields and such controls need not be transmitted in the message. Further, the tags may be freely chosen to be meaningful and thus can be of substantial assistance to a viewer of the message in detecting problems in the transmission of data and determining the location (e.g. at the transmitting or receiving end of a communication link) of the problem by relatively simple inspection by trained personnel. The collection of tags used for a given group of messages is referred to as a schema and it is not uncommon for a schema to define all tags that can be used in any message that is communicated in a given system. However, the information contained in tags can and often does exceed the length of the data itself, particularly where the message is encoded using XML that provides for both a start tag and an end tag to be applied to each datum.

Several approaches to making XML messages shorter have been proposed including XML compression such as the elimination of end tags and so-called binary coded XML in which short but non-informative tags comprising only one or a very few characters are used. However, any of these known techniques poses a problem in regard to usability, particularly for quick recognition and location of a problem with data synchronization.

SUMMARY OF THE INVENTION

It is therefore an object of the present invention to provide a method for proving dual tags for data in mark-up language messages.

It is another object of the invention to provide selection between meaningful mark-up language tags and short but non-informative mark-up language tags such as binary coded XML tags and to do so automatically based on the type of application accessing the coded message containing the data of interest.

In order to accomplish these and other objects of the invention, a method of synchronizing data coded in a mark-up language or verifying operation of a data processing system during a transformation project is provided comprising steps of reducing size of a message containing a tag delimiting a data field or table by substituting a short name in the tag for a meaningful name in the tag in a message, collecting an association of the short name and the meaningful name in a schema to establish two valid names for each data field in the message, displaying the message using the meaningful name accessed from the schema, and transmitting, storing or processing the message using the short name.

In accordance with another aspect of the invention, a data processing system for processing data coded in a mark-up language comprising a data processor, and a memory wherein a portion of the memory is configured as a schema of the mark-up language and wherein the schema provides two different valid names associated with each of a plurality of fields or tables in messages coded in the mark-up language.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figures 1, 2:
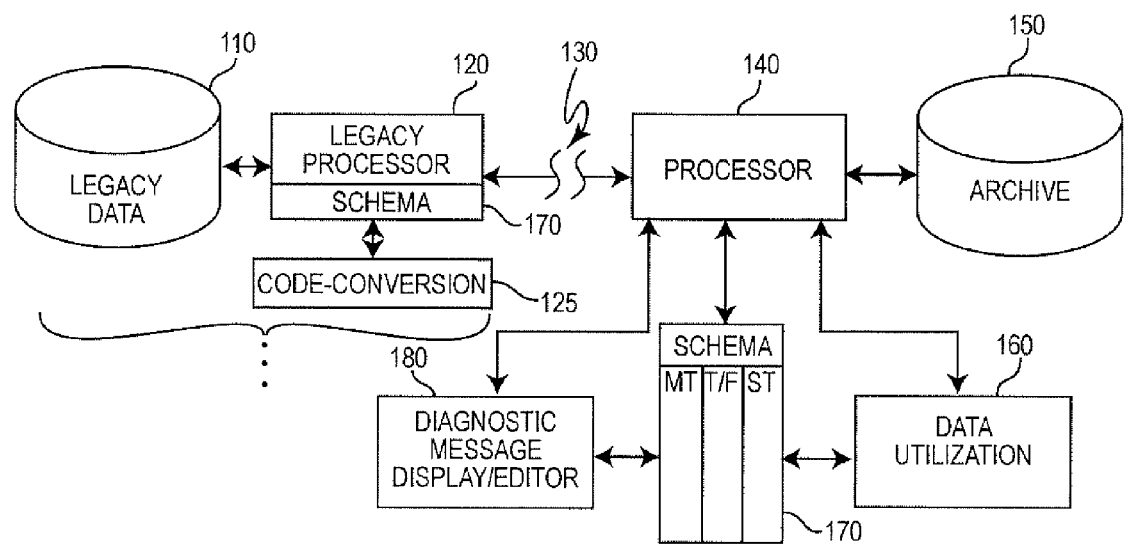
FIG. 1 is a high level block diagram of an exemplary architecture of a portion of a system on which a transformation project is being performed including the invention.
FIG. 2 is a tabular depiction of an exemplary arrangement of data in a schema in accordance with the invention.

Referring now to the drawings, and more particularly to FIG. 1, there is shown an exemplary architecture of a portion of an enterprise system in which a transformation project is in process and including the invention. Since FIG. 1 is arranged to facilitate an understanding of the invention sufficient for practice of the invention by those skilled in the art, no portion of FIG. 1 is admitted to be prior art in regard to the present invention. It should also be understood that while the invention will be described in connection with messages coded in XML, the invention is applicable to any coding language that identifies data using tags to identify data or data fields.

In the enterprise system depicted in FIG. 1, existing data is stored in database 110 and accessed from processor 120. The legend "legacy data" is intended to connote the data that has been developed prior to any arbitrary point in time by the system being upgraded, including the period within the transformation project prior to the present time. It should also be understood that processor 120 and database 110 depict a representative server in the enterprise system; of which many may exist and some may be within the duration of the same or previously initiated transformation project and which communicate over a network or communication link 130.

That is, legacy data represents data as it exists on a system being modernized or upgraded and is mapped and synchronized (e.g. by being placed in queues and transformed by an engine such as a broker) to data on the processing architecture being developed by the transformation project. New data generated on resources added to the system must also be transmitted to previously existing resources and synchronized with data existing on those resources. The synchronization process is performed substantially constantly while both systems exist simultaneously and can continue for years until full confidence in the new system is developed. Therefore, the number of messages that must be transferred and inspected in the course of a transformation project can easily run into tens or hundreds of millions or more. Processor 140 and database 150 should also be understood as illustrating a representative processor and database or other resource within an ongoing transformation project but which will eventually become a legacy server at the completion of the transformation project and, in the depiction of FIG. 1, would be considered as a legacy system in regard to any subsequently initiated transformation project.

Figure 3:
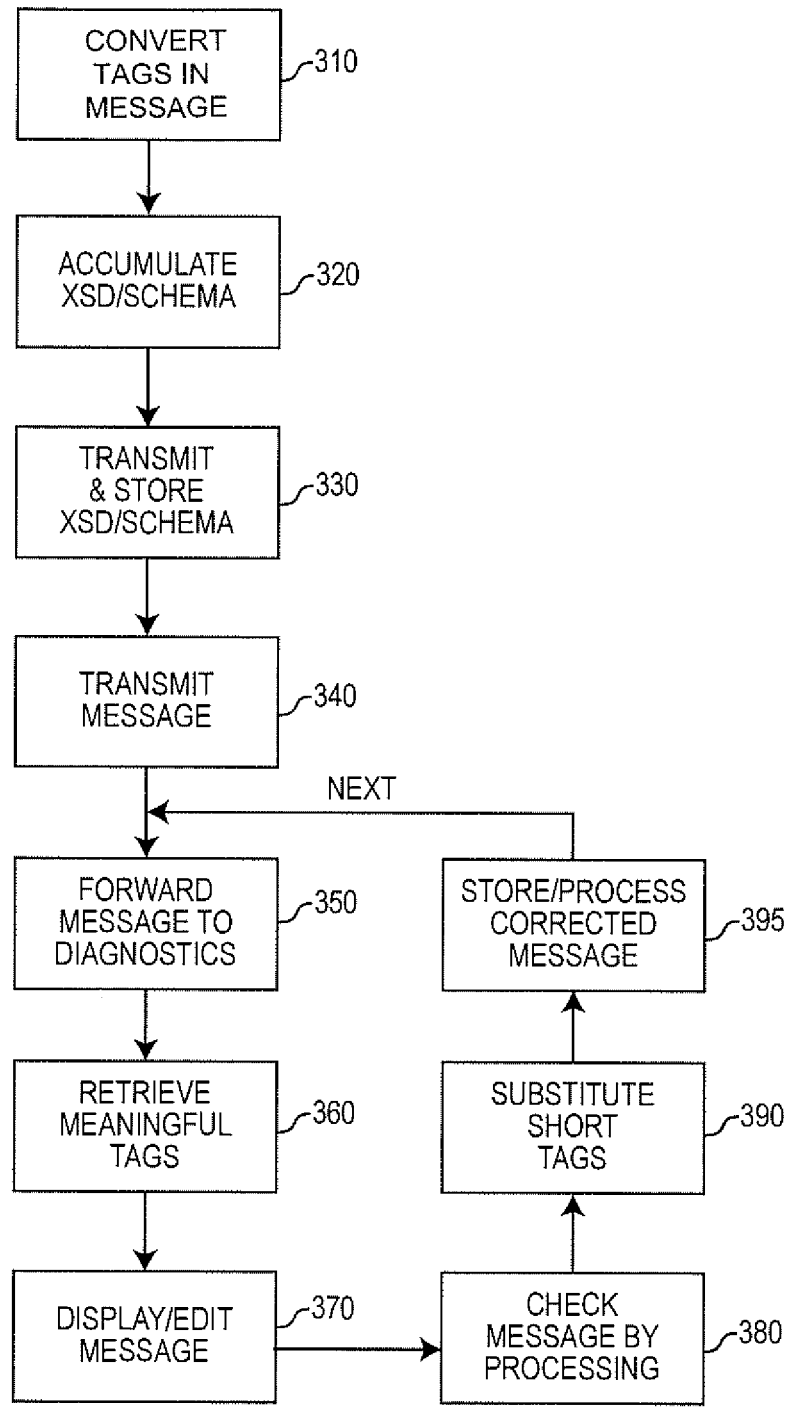
FIG. 3 is a flow chart illustrating operation of the invention when inspecting data for diagnostic purposes.

It is generally a goal of a transformation project to have all data in a consistent form and consistently coded. Thus, in accordance with the invention, code conversion element 125 is provided and its operation depicted at 310 of FIG. 3. It should be understood, however, that the code conversion function provided in accordance with the invention also includes data size reduction and the development of a schema 170 in accordance with the invention that will be discussed more fully below. An XML schema definition (XSD) is a particular type of schema, and, for purposes of this description of the invention the terms schema and XSD can be considered as being synonymous and used interchangeably. Once established, an XSD or schema will reside at both ends of any and all communication links in the enterprise system and should be identical throughout the enterprise system. An XSD or schema as used in XML may be regarded as a tabular collection of table names and field names and associated table definitions and field definitions. Constraints on the nature of the data (e.g. field length, alphanumeric, numeric or mixed data, format and the like) to be identified for a given table or field may also be included.

As alluded to above, XML statements of which messages are comprised contain start and end tags which can be of any desired content and serve to delimit the data in each statement. Doing so allows the data to be placed in a message without requiring formatting or other control information to also be contained in the message. The message and the data contained within it may then be utilized in any desired manner. For instance, the information contained in an XML-coded purchase order message may be processed in different ways to generate not only a purchase order document, but inventory controls, packing lists, shipping labels, tracking information and many other types of documents, displays and services. An example of a very small portion of a valid XML-coded message might be:

```
<Vendor_Table>
  <Vendor_name>IBM</Vendor_name/>
  <Vendor_number>123456</Vendor_number/>
  <Vendor_sequence_number>2</Vendor_sequence_number/>
</Vendor_Table/>
using meaningful names as tags.
```

It should be noted that only ten characters of alphanumeric data is contained in this message while one hundred forty characters or symbols are required to the tags. Therefore, the message is very inefficient and verbose compared to the data contained in it and thus requires many times the communication capacity that is required for only the data contained in it. The use of tags is unavoidable without engendering potential confusion between the significance of the data although, as noted above, it is possible to eliminate one of the two tags delimiting the data to reduce the number of characters and symbols in the tags by slightly more than one-half. However, if the message, itself, is viewed by trained personnel and errors and data synchronization problems can be rapidly ascertained and the location of the likely source (e.g. the transmitting end or receiving end of the communication) of the error or problem rapidly determined by simple inspection.

A valid XML message that is completely equivalent to the above message might be:

```
<T1>
  <F1>IBM</F1/>
  <F2>123456</F2/>
  <F3>2</F2/>
</T1/>
``` in which only forty symbols or characters are used in the start and end tags to convey the same data which can be fully utilized without confusion. This number of symbols and characters could be further reduced if only one character is used in the names enclosed within the tag marker symbols and/or omission of either the start tag or end tag for each field. This type of coding is sometimes referred to as binary-coded XML and is a known technique for compressing XML-coded messages. However, while much greater efficiency can be achieved using short names for fields, the names are not at all informative (unless the number of names used is small enough to be memorized, which is seldom the case) and do not support detection and location of data synchronization problems by inspection as can readily be performed by trained personnel if the names used in XML tags are chosen to be meaningful. Therefore, there is a trade-off between ease of problem detection and correction and the communication resources required for communication of a message containing data. This trade-off becomes particularly critical during a transformation project where the correct synchronization of legacy data must be verified. It should be appreciated that utilization of data contained in a message also requires communication of the message, even if only between a memory device and the associated processor. In most cases, however, much more communication and processing would be involved. Therefore longer tags can compromise all aspects of enterprise system performance.

The invention avoids this trade-off entirely by providing a schema or XSD that establishes two valid names for each field: a short name and a longer, meaningful name, as is normally provided. Such a schema or XSD can be visualized as illustrated in FIG. 2. In FIG. 2, the schema or XSD 170 is divided into three columns: a table or field definition column 171, a short name column 172 and a meaningful name column 173, whereas only column 171 and an additional column for the field names (that may be short or meaningful or any combination thereof) would exist a in an XML schema or XSD of known type. The XML schema or XSD in accordance with the invention exists on processors/servers (e.g. in memory) at both ends of each communication path and is preferably accessible in accordance with either the short name or the meaningful name. During a transformation project the XML schema or XSD need be transmitted only once to any additional equipment added to the enterprise system during the transformation project. Of course the content of the XML schema or XSD can be modified system-wide at any time as additional tables and fields are defined for additional types of data to be included in messages.

An XML schema or XSD in accordance with the invention may be readily developed from legacy XML messages for which a legacy XML schema or XSD will already exist. Since the table or field names can be arbitrarily assigned and are likely to have been used in previous error and problem diagnosis and remediation, the field names in an existing legacy XML schema or XSD will likely be similar to the meaningful names of column 173 corresponding to the first example above. Thus, in creating an XML schema or XSD in accordance with the invention, the field names are parsed to detect if any existing field name in the legacy schema could be generated by a candidate strategy (e.g. sequential numbers and/or symbols such as an alphanumeric sequence) for tables and fields, respectively, as illustrated for generation of short field names and the short name creation strategy adjusted to avoid such a possibility. The parsing can be performed initially or as new field names are encountered in a sequence of legacy messages. Then, as new field names are encountered, short names can be generated to populate column 172 of FIG. 2 at each processor 120, 140 and the short field name substituted for the meaningful name in each message transmitted or processed at code conversion element 125 of FIG. 1 as depicted at 320 of FIG. 3. On the other hand, code conversion need not be performed for any tag for which a short name has previously been provided through operation of the invention. Further, if a meaningful field name occurs in massages only rarely and is not of excessive length, a short field name need not be generated and substituted. That is, the invention provides the capability of providing two valid names for each field but may or may not be used in every instance of every name or field. When a message has been converted to include short names, any update of the XSD and the converted message can be transmitted over link 130, as depicted at 330 and 340 of FIG. 3.

The above synchronization of data and code conversion is sufficient to support substantial improvements in performance of processing, storage and communication resources of the enterprise system. While the schema may be large, the size is not significantly increased by addition of even a large number of short names. Further, changes to the schema do not require significant communication resources to distribute the change to all processors of the enterprise system. While the number of messages to be communicated may number in the millions and may individually be of substantial length, the schema need be communicated only once to each processor. However, additional advantages of the development of an XML schema or XSD providing two valid names for each field may also be derived through use of the invention. Returning again to FIG. 1, schema 170 is schematically illustrated in association with a processor and a data utilization element 160 and diagnostic message display/editor 180 which are also associated with (and preferably provided as functions of) processor 140. The data utilization element 160 is simply a symbolic depiction of any and all processing of the data contained in messages communicated over the enterprise system such as generation of numerous documents from an order message as alluded to above. Other than improving the processing of such data through use of shorter and more quickly accessed shorter table and field tags through use of code conversions and synchronization (e.g. to a consistent coding) 125 of messages, these functions are not involved in the operation of the invention and need not be discussed further.

On the other hand, as alluded to above, during a transformation project, the ability of the system to properly communicate and synchronize data and messages must be verified through use of diagnostic software and any problems discovered must be rectified. In general, any problem discovered must be evaluated by trained personnel to discern the nature and location of the problem. Trained personnel are generally able to make such determinations very quickly by inspection of messages if displayed in conventional XML which contains meaningful (e.g. longer) tags that are descriptive of the nature of the data which the tags delimit in the messages. However, this process is very much more complicated if short tags such as those used in binary-coded XML are used which do not convey such information to trained personnel. Specifically, the trained personnel viewing a coded message containing short tags must determine the identity of each data field in the message; the number of which is not limited and would typically be large. Further, correction of any problem cannot be effected without determining the appropriate short tag(s) to be applied to the data; the coding of short tags not being at all intuitive.

To avoid such problems which are incurred by size reduction of XML, the invention provides for a separate processing path for performing diagnostics on communicated messages that restores meaningful tags for the diagnostic process while messages otherwise remain in reduced (but still valid in the mark-up language being utilized) form for storage and normal utilization processing. Specifically, and with reference again to FIG. 3, when a message is communicated or accessed from memory (e.g. archive 150) for diagnostic purposes by processor 140 it is forwarded to diagnostic message display/editor 180, as depicted at 350 of FIG. 3. The message, as communicated or accessed will be in reduced form using short tags. The diagnostic message display/editor 180 then accesses the schema or XSD using the short tags and retrieves the corresponding meaningful tags, as depicted at 360 of FIG. 3, which are then substituted in the message for display to trained personnel. The trained personnel can then determine the nature and location or the problem, generally by inspection, and usually effect a correction by simple editing of the message using simple text editor software as depicted at 370 of FIG. 3. The correction made can be immediately checked, as depicted at 380 of FIG. 3, since the message containing the meaningful names as tags is also a valid XML (or other mark-up language) message and can be directly processed in any desired manner. When the correction is complete, the schema is again accessed through use of the meaningful names to retrieve the short names for substitution 390 into the message which can then be re-communicated, stored or otherwise processed (e.g. for normal utilization of the data in the message) in reduced form, as depicted at 395 of FIG. 3; all of which are facilitated through use of the short name tags. It should be appreciated that any automated diagnostic processes which generally provide for formatting and display of computer code or any other arrangement for display of coded messages can be easily arranged to control access to a schema for substitution of meaningful name tags for short tags and vice-versa in a manner that is completely transparent to a user such as the trained personnel that will review messages, evaluate problems and make corrections. Thus, the trained personnel can view the coded message essentially as it existed prior to initial code conversion 125 that may have occurred during a current transformation project or even a transformation project completed much earlier. By the same token, the location of a problem (e.g. at the transmitting or receiving end of a communication link) can be readily discerned from the nature of any inconsistency between the data and the meaningful name, including legacy problems that may not have been detected in an earlier transformation project.

In view of the foregoing it is seen that the invention provides for associating two valid names, usable as tags, for each field defined under a given mark-up language such as XML. Transmission, storage and processing of messages as well as assuring consistent coding is provided by the data reduction incident to substitution of short names for meaningful names for tables and data fields while ease of problem detection, location and correction using a simple text editor in connection with meaningful names that also preserve the validity of the message containing meaningful field names is preserved while avoiding the transmission storage and processing penalties and trade-offs incurred through greater message length. The invention can easily be implemented in a manner which allows it to provide these effects in a manner which is completely transparent to a user such as trained personnel engaged in a transformation project during which communication traffic is likely to be substantially increased and which the invention significantly facilitates.

While the invention has been described in terms of a single preferred embodiment, those skilled in the art will recognize that the invention can be practiced with modification within the spirit and scope of the appended claims.

We claim:

1. A method of synchronizing data coded in a mark-up language, said method comprising steps of
   reducing size of a message containing a tag delimiting a data field or table by substituting a short name in said tag for a meaningful name in said tag in said message,
   collecting an association of said short name and said meaningful name together with a table definition or field definition in a schema or extensible markup language schema definition (XSD) to establish two concurrently valid names for each data table or field in said message whereby said short name and said meaningful name can be used interchangeably in said tag delimiting said table or data field,
   accessing said schema or XSD with said meaningful name or said short name, respectively, in said message over separate processing paths,
   displaying and processing said message using said meaningful name accessed from said schema or XSD for facilitating detection and correction of errors, and
   transmitting, storing or processing said message using said short name,
   whereby said processing of said message, including accessing and processing of data in fields or tables delimited by said tags using either of said concurrently valid meaningful name or said concurrently valid short name concurrently and interchangeably for each respective table or data field is enabled.

2. The method as recited in claim 1, wherein said mark-up language is extensible mark-up language.

3. The method as recited in claim 1, comprising a further step of
   compressing said message.

4. The method as recited in claim 3, wherein said step of compressing said message includes
   removing one of a start tag and an end tag from a field or table in said message.

5. The method as recited in claim 1, including a further step of
   editing said message including said meaningful name as a tag.

6. The method as recited in claim 5, including the further step of
   verifying changes made in said message by said editing step.

7. The method as recited in claim 6, wherein said verifying step includes
   processing said message using said meaningful name as a tag.

8. The method as recited in claim 7, including a further step of substituting said short name for said meaningful name.

9. The method as recited in claim 1, wherein a plurality of said short names form an alphanumeric sequence.

10. A method for verification of a data processing system capable of processing data coded in a mark-up language during a transformation project, said method comprising steps of
    reducing size of a message containing a tag delimiting a table or data field or table by substituting a short name in said tag for a meaningful name in said tag in said message,
    collecting an association of said short name and said meaningful name together with a table or field definition in a schema or extensible markup language schema definition (XSD) to establish two concurrently valid names for each table or data field in said message whereby said short name and said meaningful name can be used interchangeably in said tag delimiting said table or data field,
    accessing said schema or XSD with said meaningful name or said short name, respectively, in said message over separate processing paths,
    displaying and processing said message using said meaningful name accessed from said schema or XSD for facilitating detection and correction of errors, and transmitting, storing or processing said message using said short name, whereby said processing of said message including accessing and processing of data in fields or tables delimited by said tags using either of said concurrently valid meaningful name or said concurrently valid short name concurrently and interchangeably for each respective data field is enabled.

11. The method as recited in claim 10, wherein said mark-up language is extensible mark-up language.

12. The method as recited in claim 10, comprising a further step of compressing said message.

13. The method as recited in claim 12, wherein said step of compressing said message includes removing one of a start tag and an end tag from a field or table in said message.

14. The method as recited in claim 12, including a further step of editing said message including said meaningful name as a tag.

15. The method as recited in claim 14, including the further step of verifying changes made in said message by said editing step.

16. The method as recited in claim 15, wherein said verifying step includes processing said message using said meaningful name as a tag.

17. The method as recited in claim 16, including a further step of substituting said short name for said meaningful name.

18. The method as recited in claim 10, wherein a plurality of said short names form an alphanumeric sequence.

19. A data processing system for processing data coded in a mark-up language, said data processing system comprising a data processor including two separate processing paths, and a memory, wherein a portion of said memory is configured as a schema of said mark-up language or an extensible markup language schema definition (XSD) and wherein said schema or XSD includes a table or field definition and provides two different concurrently valid names associated with and delimiting each of a plurality of fields or tables in messages coded in said mark-up language, said two different concurrently valid names including a short name and a meaningful name, whereby said short name and said meaningful name can be used interchangeably in said messages and respectively accessed from said schema or XSD in said memory through a respective one of said two separate processing paths such that a message can be processed and displayed using meaningful names to facilitate detection and correction of errors and validation of said message and said message can be transmitted, stored or processed using a short name, whereby said processing of said message using either of said concurrently valid meaningful name or said concurrently valid short name concurrently and interchangeably for each respective data field is enabled.

20. A data processing system as recited in claim 19, wherein said mark-up language is extensible mark-up language.

* * * * *